United States Patent [19]

Luitwieler, Jr. et al.

[11] 3,859,528
[45] Jan. 7, 1975

[54] GAMMA RAY APPARATUS WITH SAMPLE CHANGER

[75] Inventors: Samuel H. Luitwieler, Jr., La Habra; Paul R. Klein, Laguna Niguel; Dale Dario Robinson, Placentia, all of Calif.

[73] Assignee: Beckman Instruments, Inc., Fullerton, Calif.

[22] Filed: Mar. 26, 1973

[21] Appl. No.: 344,717

[52] U.S. Cl. ............................................. 250/328
[51] Int. Cl. ............................................. G01t 7/08
[58] Field of Search ................................... 250/328

[56] References Cited
UNITED STATES PATENTS

| | | | |
|---|---|---|---|
| 3,141,977 | 7/1964 | Fratantuno | 250/328 |
| 3,270,202 | 8/1966 | Long et al. | 250/328 |
| 3,422,268 | 1/1969 | Meinig | 250/328 |

*Primary Examiner*—Archie R. Borchelt
*Attorney, Agent, or Firm*—John G. Mesaros; R. J. Steinmeyer

[57] ABSTRACT

Gamma ray measuring apparatus having a multi-compartment sample holder incrementally advanced along the surface to a measuring station. The sample holder contains a plurality of sample containing vials in close mating relationship within the compartments, each compartment being provided with an aperture in the bottom thereof, the aperture being of smaller dimension than the cross-sectional dimension of the vial. A detector assembly at the measuring station has an elongated access port therein, the lower portion of the access port having a funnel-shaped entrance end with the upper portion thereof having a crystal detector in proximity thereto. An elevating rod passes through the aperture engaging the bottom surface of the vial to raise the vial guided by the compartment and the funnel-shaped entrance through the access port into the sample chamber adjacent the crystal detector for sample measurement. The elevating rod is made of a shielding material for shielding the crystal detector from rays emanating from samples within the sample holder. Provision is made for access to the well by means of a manual sample access port in alignment with the upper portion of the well. The port is plugged during operation of the apparatus in the automatic mode, and a special vial holder is provided for access to the well in a manual mode.

11 Claims, 6 Drawing Figures

Patented Jan. 7, 1975 3,859,528
3 Sheets—Sheet 3
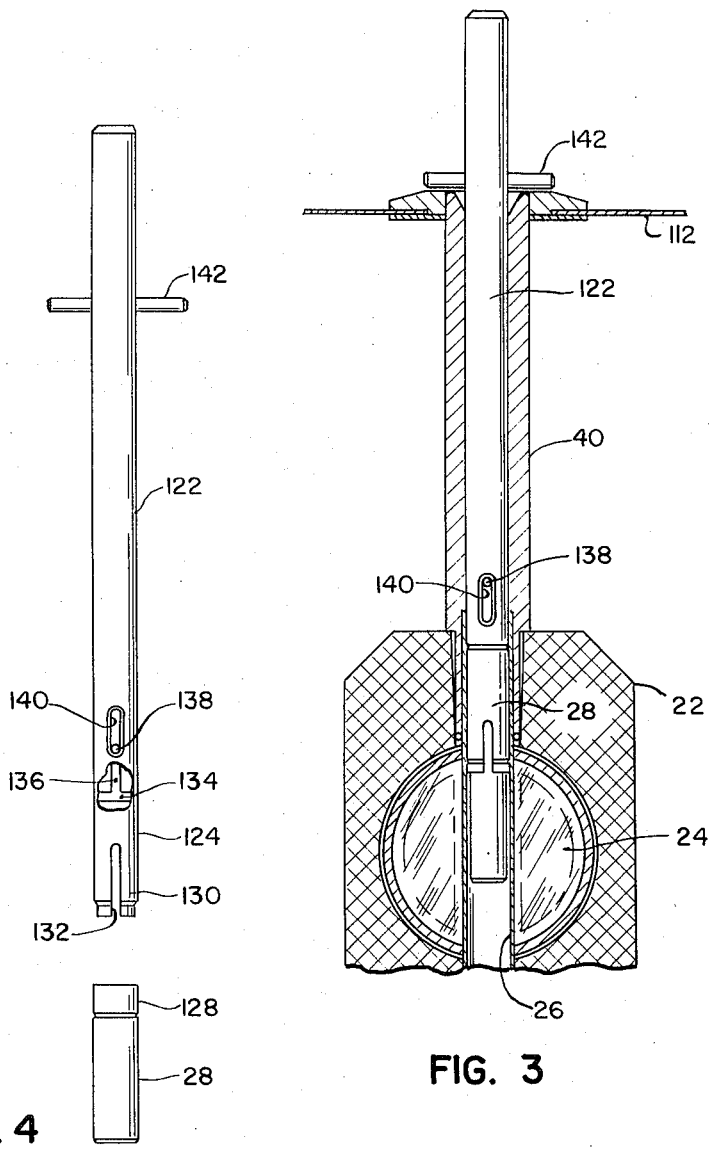
FIG. 3
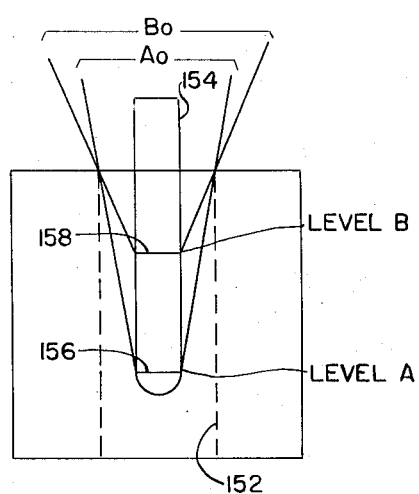
FIG. 4
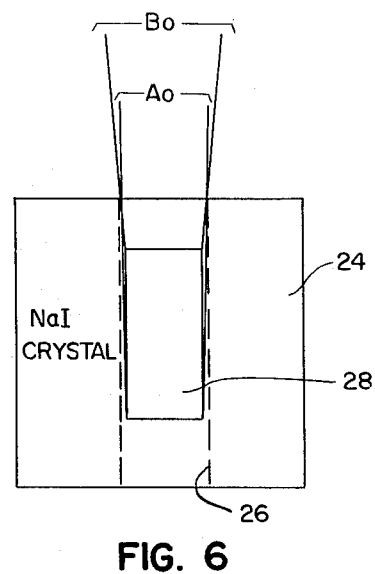
FIG. 5
FIG. 6

GAMMA RAY APPARATUS WITH SAMPLE CHANGER

BACKGROUND OF THE INVENTION

This invention relates to radiation source measuring apparatus, and more particularly to gamma ray measuring apparatus.

In gamma ray measuring apparatus a scintillator is provided for measuring the radioactivity of a sample contained within a container in proximity to the scintillator. Such apparatus requires shielding in the sample measuring area adjacent the scintillator to provide measurements indicative of only the radiation emanating from the sample. In prior art gamma counters samples are often contained within a test tube which are lowered into a well type detector crystal, the crystal being photo-optically coupled to at least two photomultiplier tubes. Such well type crystals have disadvantages resulting from the possibility of the sample being spilled into the crystal during the loading or unloading process, resulting in the necessity for decontamination of the relatively inaccessible crystal. Furthermore, with such a configuration the measurement of the radioactive source is volume-dependent with the accuracy of the measurement being determined by the volume of the sample within the test tube. Additionally, with more than one photomultiplier tube a sufficient amount of lead shielding must be utilized around both phototubes as well as the crystal, resulting in a large amount of weight as well as volume for the required shielding. This results in heavy bulky, floor-model gamma counters which are relatively immovable.

In such prior art gamma counters, automatic sample handling means are provided to sequentially measure a plurality of samples established in a predetermined order. In these counters a mechanism is provided for coacting with the sample, lowering the sample into a well in proximity to the crystal detector, measuring the radioactivity, elevating the sample, and then incrementing the plurality of samples to the next sample to be measured. If, during the automatic operation, it is desired to take a single sample measurement of a sample not within the sequence, it is oftentimes necessary to interrupt the automatic mode of operation, remove a sample from the sample sequencing mechanism, insert the single sample into the proper location, and manually energize the means for lowering the sample into the well for the measurement, reenergize the sample elevating means, remove the sample and reinsert the removed sample in its proper location. Consequently, single sample measurement is extremely cumbersome with the possibilities of contamination existing as previously discussed by spilling of a sample during the handling process.

SUMMARY OF THE INVENTION

Accordingly, it is an object of the invention to provide a new and improved radiation source measuring apparatus.

It is another object of the invention to provide a gamma radiation measuring system having automatic sample handling means.

It is a further object of this invention to provide a gamma radiation measuring system which is not dependent upon the volume of the sample.

It is still another object of the invention to provide a gamma radiation measuring system which minimizes problems of contamination in the vicinity of the crystal detector.

It is still another object of the invention to provide an automatic gamma radiation measuring system having single sample measurement capability without interrupting the sample number sequence.

It is a still further object of the invention to provide a compact relatively movable automatic gamma radiation measuring system.

The foregoing and other objects of the invention are accomplished by providing a gamma ray measuring apparatus having a multi-compartment sample holder incrementally advanced along a sample changing surface to a measuring station. The sample holder contains a plurality of sample containing vials in close mating relationship within compartments, each compartment being provided with an aperture in the bottom thereof, the aperture being of smaller dimension than the cross-sectional dimension of the vials. A detector assembly at the measuring station has a crystal detector therein with a cylindrical opening extending therethrough, the cylindrical opening having coaxial therewith an upper manual sample injection port and a lower automatic sample injection port having the lower end thereof funnel-shaped. The upper port is normally plugged when the apparatus is used in the automatic mode. An elevator mechanism is provided with an elevating rod passing through the surface of the sample changer through the aperture of the aligned compartment for engaging the bottom surface of the vial to raise the vial which is guided by the compartment side walls and the funnel-shaped entrance of the automatic sample port into the crystal opening for measuring the radioactivity of the sample. The vial is configured for close mating relation within both the compartment as well as within the upper and lower ports and the opening within the crystal. A disposable contamination shield is provided for insertion into the automatic sample port and the opening within the crystal to permit ready removal and replacement in the event of contamination adjacent the crystal detector. The elevating rod remains in position during the measurement process, with the rod being composed of a shielding material to shield the detector from radiation emanating from samples contained within the sample holder in proximity to the lower port. A single sample holder is provided for insertion into the upper port with the lead plug removed to provide manual sample measuring capability without disturbance of the samples within the sample holder.

Other objects, features and advantages of the invention will become apparent from the following specification when taken in conjunction with the accompanying drawing.

BRIEF DESCRIPTION OF THE DRAWINGS

FIG. 3 is a partial cross-sectional view similar to FIG. 2 showing a manual sample holder in position for measurement;

FIG. 4 shows the single sample holder, partially broken away, to illustrate the extractor mechanism;

FIG. 5 illustrates diagrammatically the geometry of a prior art crystal detector for utilization with a test tube containing a sample; and FIG. 6 illustrates diagrammatically the geometry of the crystal detector of the instant invention in conjunction with the sample holding vial for use therewith.

DESCRIPTION OF THE PREFERRED EMBODIMENT

Figure 1:
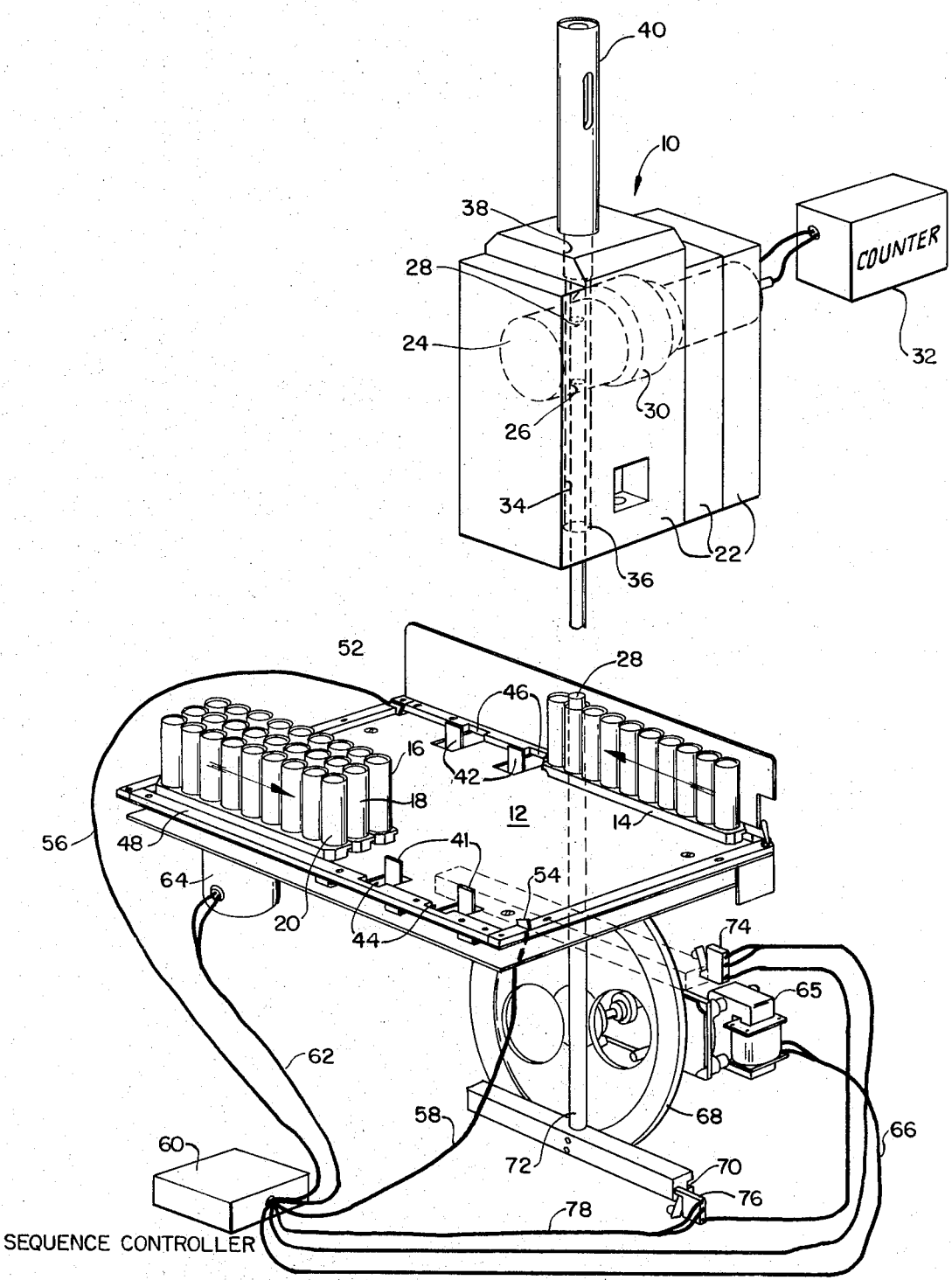
FIG. 1 is an isometric view of an apparatus according to the invention with the detector assembly displaced from the sample changer for ease of illustration.

Referring now to the drawings and particularly to FIG. 1, there is shown a gamma ray radiation measuring system having a detector assembly 10 positioned immediately above a sample changing mechanism 12 having a surface upon which a plurality of sample holders 14, 16, 18 and 20.

The detector assembly 10 includes a plurality of lead bricks 22 surrounding a crystal detector 24, such as a NaI(Tl) crystal having a cylindrical opening or chamber 26 extending therethrough for insertion of a sample holding vial 28 therein for radiation measurement. The cell 24 is configured generally cylindrical with the chamber 26 disposed generally centrally between the parallel surfaces of the cylinder, one of the surfaces being photo-optically coupled to a photomultiplier tube 30 which detects the gamma ray striking the crystal and being absorbed, the interaction of the gamma ray within the crystal then being counted by the phototube by appropriate conventional counting means 32. Coaxial with the sample chamber 26 is a downwardly depending entrance port 34 having an outwardly divurging funnel-shaped entrance end 36. Extending in a direction opposite to entrance port 34 is a coaxially aligned manual entrance port 38 for providing access from the top of detector assembly 10 into the sample chamber 26 by means of an interconnecting tube 40.

The sample changer mechanism 12 has positioned thereon a plurality of multi-compartmented sample holders 14, 16, 18 and 20 (only four of which are shown), each such sample holder having contained within the compartments thereof vials 28 (only one of which is shown) containing samples, the radioactivity of which is to be measured. The sample sequence is suitably noted for automatic measurement. A sample changer suitable for use with the apparatus similar to the sample changer 12 is shown and described in U.S. Pat. No. 3,221,781 issued to B. G. Forsstrom on Dec. 7, 1965. Briefly, such a sample changer has first means for simultaneously incrementing sample holders 14 and 20 in opposite directions (the respective directions being indicated by the arrows imprinted on the sample holders), and second means including upwardly projecting pairs of fingers 41 and 42 for displacing an entire column of sample holders in opposite directions transverse to the incremental direction of the sample holders 14. The sample holders 15 are originally positioned on the surface of the sample changer 12 so that the entire surface thereof is filled, with the exception of a first position adjacent fingers 41 and a second position adjacent fingers 42 (fingers 41 and 42 are originally retracted into the pairs of recesses 44 and 46, respectively). The recesses 44 and 46 are formed in guide shoulder means 48 extending about the periphery of the surface of sample changer 12 to limit movement of the sample holders 14 in a rectilinear fashion. During operation of the sample changer 12 the outer sample holders 14 and 20 are incremented simultaneously one compartment at a time in the direction of the arrows as shown by means of simultaneously actuated incrementing means (one incrementing means 50 being shown in FIG. 2). After both sample holders 14 and 20 are incremented to the extreme opposite edge of shoulder 48, the leading edges thereof abut switch actuating means 52 and 54, respectively, which trip switches (not shown), the actuation of which is sensed by means of leads 56 and 58, respectively, by a sequence controller 60. The sequence controller 60 then issues a command on lead 62 to energize motor 64 to simultaneously actuate each pair of fingers 41 and 42 (to the operative position shown) thereby displacing each of the two columns of sample holders in a direction transverse to the incremental direction traveled by the sample holders until sample holder 18 is in the position previously occupied by sample holder 20 and a new sample holder is inserted in the position previously occupied by sample holder 14.

As each vial 28 within the sample holder 14 is incremented to a position in alignment with the access port 34, the sequence controller 60 energizes a motor 65 by means of lead 66, the motor 65 being utilized to drive a disc member 68 having a projection extending from the surface thereof to slidably engage the inner surface 70 of a generally C-shaped guide member 70 which is suitably supported by means (not shown) for vertical travel in response to the rotation of disc 68. Disposed generally centrally and perpendicular with respect to guide rail 70 is an elevating rod 72 which engages the bottom of vial 28 by means of an aperture in the lower surface of the compartment to raise vial 28 into position with vial 28 within measuring chamber 26 (as shown in solid lines for clarity of illustration). The upper limit of travel of guide rail 70 (shown in dotted lines) results from one-half revolution of disc 68 and is detected by means of a switch 74 which energizes suitable circuitry within sequence controller 60 (suitably electrically coupled to the counter 32) to thereby initiate the radiation measuring electronics within counter 32. Counter 32 can be, for example, a conventional counter utilizing a signal channel operating under control of a timer channel to measure the pulse count over a predetermined time period. Upon the cessation of the measuring cycle, counter 32 initiates an electrical signal to the sequence controller 60 (by cable means not shown) whereupon sequence controller 60 re-energizes motor 66 to drive disc 68 one-half revolution to thereby lower the vial 28 into the compartment within sample holder 14 from which it was taken. The lower limit of guide rail 70 is sensed by the actuation of a second limit switch 76, which initiates a signal over lead 78 to the sequence controller 60 which then increments the outer sample holders 14 and 20 one step until the next vial is at the measuring station.

Figure 2:
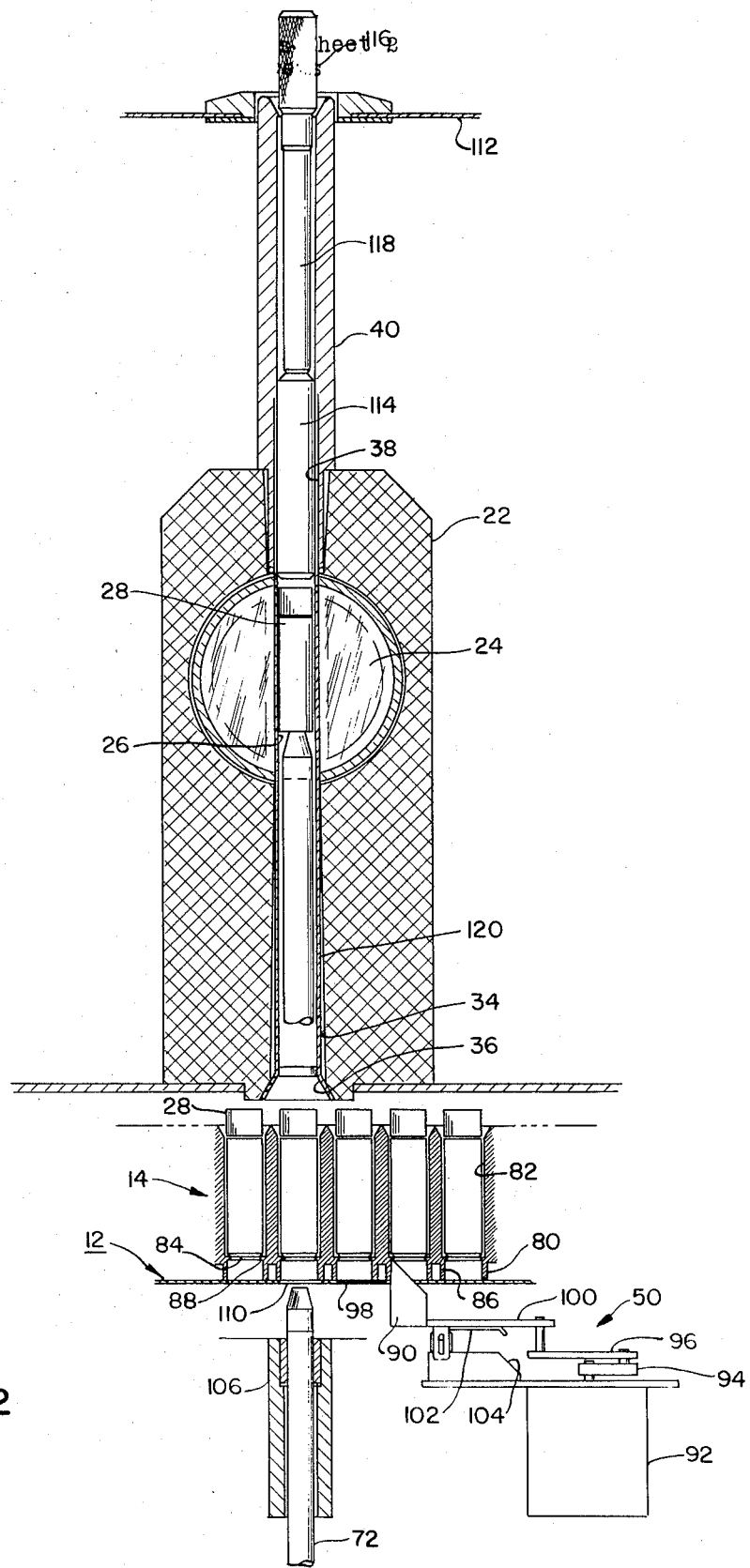
FIG. 2 is a cross-sectional view taken through the aligned automatic sample port and manual sample port showing in cross section the sample container and sample holding vials.

The details of the incrementing means 50 are better illustrated in FIG. 2. The sample holder 14 has a base portion 80 with a plurality of aligned cylindrical compartments 82 positioned thereon for containing the sample holding vials 28. As shown in the drawing, the vials 28 are cylindrical and of slightly smaller diameter than the compartments 82, with the lower portion of each compartment 82 having an aperture 84 extending therethrough into a cavity 86 within the hollow base portion 80. The aperture 84 is of slightly smaller diameter than the diameter of vial 28 so that the vial rests on a shoulder portion 88 formed by the circumference of aperture 84. The width of cavity 86 in the direction of travel is generally equal to the diameter of compartment 82, the incrementing means 50 having an actuating projection 90 adapted for engaging the interconnecting web between adjacent cavities 86.

In operation of the incrementing means 50 a motor 92 is sequentially energized by means of a cable (not shown) coupled to sequence controller 60 to provide one complete revolution of a crank arm 94 to drive a rod linkage 96 coupled to the incrementing projection 90 in the desired direction of travel within a slot 98 in the surface of sample changer 12. As the projection 90 is incremented to the extreme left (as viewed in FIG. 2) of slot 98, the arm 100 coacting with projection 90 is configured to clear the pivotal ramp surface 102 upon which arm 100 slides. Projection 90 along with arm 100 then drops out of engagement with cavity 86 so that during return travel of crank arm 94, the projection 90 along with arm 100 are moving to the right beneath pivotal ramp surface 102 until projection 90 is clear of the ramp surface 102, pivotal ramp surface 102 being so constructed to rotate clockwise until the free end thereof abuts fixed ramp surface 104. During the next incremental operation of incrementing means 50 the projection 90 then slides upwardly along fixed ramp surface 104 and along the bent free end of pivotal ramp surface 102, thereby forcing pivotal ramp 102 counterclockwise until it is in the position shown for the next incrementing cycle.

When the sample vial 28 is at its measuring station (in alignment with rod 72), rod 72 is then elevated by means of the elevator mechanism, the rod 72 being supported adjacent the sample changer surface by means of a suitable bearing 106. During the elevation of the sample vial 28 the close proximity of the cap of the sample vial 28 to the funnel-shaped entrance 36 of access port 34 plus the close mating relationship of the walls of compartment 82 (the walls having a height slightly less than the height of the vials 28) serve to guide the sample vials 28 into the axis port 34 until the vial is in the dotted line position shown in proximity to the crystal detector 24. The rod 72 passes through an aperture 110 in the surface of sample changer 12. The rod 72 is composed of a tungsten alloy material commercially known as Kennertium which is an effective shielding material, and with the rod 72 fully extended into the access port 34, the shielding material of the rod in conjunction with the length of the access port 34 effectively prevents a substantial amount of radiation impinging upon the crystal detector 24 from samples within the vials 28 in proximity to the entrance end of access port 34.

As previously discussed, a second access port communicates with the chamber 26 by means of the aperture 38 having extending therein a tubular member 40, the upper end of which is supported by a sheet metal plate 112 which can be, for example, a portion of the enclosure surrounding the gamma ray measuring apparatus. Extending through the opening of the tubular member 40 is a lead plug 114 having a handle 116 disposed exteriorly of the enclosure sheet metal 112, with an interconnecting rod member 118.

Disposed within the access port 34 is a plastic disposable sleeve member 120 having a funnel-shaped entrance end, the sleeve 120 being disposed along the entire length of the access port 34 as well as the entire length of the chamber 26 within the detector 24.

As shown in FIG. 2, the access port 34 has a tapered diameter from the bottom thereof to the upper end thereof, with the sleeve 120 having a uniform cross section to provide an opening between the outer surface of sleeve 120 and the inner surface of access port 34 adjacent the lower portion thereof. This construction permits ease of insertion of the sleeve 120 and further provides a certain amount of resiliency of the sleeve 120 adjacent the lower portion thereof, thereby permitting a certain amount of lateral play between sleeve 120 and access port 34 during the insertion of a vial 28 up into the measuring chamber 26. In the event of spills or leakage during insertion or removal of a sample vial 28, such contamination would be confined to the inner surfaces of the sleeve 120, which can be readily removed and disposed of and a new sleeve 120 inserted. Consequently any decontamination required would be limited to decontamination of the readily removable sample holders 14.

Referring now to FIGS. 3 and 4, FIG. 4 shows a single sample holder 122 having a resilient tubular portion 124 adjacent the lower end thereof. The portion 124 is configured to engage the cap 128 of a sample vial 28 by means of the tines 130 formed by means of the elongate open-ended slots 132 disposed axially in the resilient sleeve 124. For removal of the vial 28 a retractor mechanism is provided including a plunger 134 connected to an axially slidable rod member 136 coupled to a finger actuator 138 disposed within a slotted opening 140 in the rod 122. A transversely extending rod member 142 is secured through the rod member 122 adjacent the upper end thereof so that the single sample holder can be inserted into the access port 40 as shown in FIG. 3 with the transversely extending rod portion 142 resting on the upper end of tubular member 40 to position the sample vial 28 in close proximity within the chamber 26 of the crystal detector 24. The single sample can be inserted without disturbing the sample vials 28 within the sample holder 14. In this way the automatic sequence can be interrupted and then resumed without loss of sample sequence.

Referring now to FIGS. 5 and 6, FIG. 5 illustrates a crystal detector 150 having a hole or sample receiving chamber 152 extending therethrough for receiving a sample container such as a test tube 154. The test tube 154 is shown as containing one of two levels of samples, the "A" line being shown at 156 while the level "B" line is shown at 158. When the hole 152 is large with respect to the sample holder 154, volume dependent measurements result. To illustrate this, lines are drawn diverging upwardly from level A, the angle being designated $A_0$ and lines are drawn upwardly from level B, the lines being designated $B_0$. When samples are counted inside a crystal, all the emission in the segment $A_0$ and $B_0$ are lost. The larger the segment the higher percentage of emission is lost. If this segment is constant with volume, the system is volume independent (that is, the count rate is not affected with volume change). As can be seen in FIG. 5, when the volume of the sample within the test tube 154 changes the segment $A_0$ differs greatly from $B_0$, thereby resulting in systems with large sample receiving holes 152 being very volume dependent.

As shown in FIG. 6, in accordance with the apparatus shown, the crystal 24 has a sample receiving chamber 26 having inserted therein a sample vial 28, the outer diameter of which is slightly less than the size of the opening of chamber 26. Furthermore, the elevating mechanism precisely positions the sample vial 28 within the chamber 26, thereby resulting in uniform positioning of the sample vial from sample to sample. The segments designated $A_0$ and $B_0$ respectively illustrate a practically empty sample vial 28 and a completely full vial. As a consequence, with the sample vial 28 being configured specifically for apparatus as shown, segments $A_0$ and $B_0$ change insignificantly, resulting in virtually volume independent measurement.

Accordingly it can be seen that by utilization of a standard measuring vial in conjunction with a multi-compartmented sample holder for insertion of the vial upwardly through an access port into a crystal detector by a precisely locating elevating mechanism the foregoing advantages are obtained. Furthermore, single sample measurement can be expeditiously accomplished by means of the upper access port and the specially configured single sample holder. Additionally, with this construction a compact table top gamma counter results.

While there has been shown and described a preferred embodiment, it is to be understood that various other adaptations and modifications may be made within the spirit and scope of the invention.

We claim:

1. In radiation source measuring apparatus, the combination comprising:

a detector assembly having a vertically aligned sample chamber and an elongate access port communicating therewith and depending therefrom;

sample changer means for incrementally advancing each of a plurality of sample containers in proximity to and beneath said access port in alignment therewith, said sample changer means including at least one sample holder having a plurality of substantially identical compartments with wall means substantially surrounding said sample container, each compartment having in the base thereof an aperture, said sample containers having a cross sectional configuration larger than said aperture for resting on said base;

elevating means beneath said sample changer means and including a rod disposed in alignment with said access port, said rod being selectively operable through said sample changer means and said aperture for engaging the bottom surface of said sample container, said sample containers being guided into said access port by said wall means.

2. The combination according to claim 1 wherein said sample container is a cylindrical vial and said wall means is a cylindrical surface of slightly greater diameter than said vial, said wall means having a height substantially the height of said vial.

3. The combination according to claim 2 wherein the aperture in the base of each of said compartments is a circular aperture of slightly smaller diameter than the diameter of said vial and said rod has a circular cross section of slightly smaller diameter than its said aperture.

4. The combination according to claim 3 wherein said detector assembly includes a radiation detector having the sample chamber formed therein, said sample chamber having a circular cross section of a diameter slightly greater than the diameter of said vial.

5. The combination according to claim 4 wherein said radiation detector is a scintillator crystal and has a photomultiplier tube optically coupled thereto, said scintillator crystal and said photomultiplier tube being substantially surrounded by shielding material and said access port is formed in said shielding material.

6. The combination according to claim 5 wherein said access port has a funnel-shaped entrance end in proximity to said sample holder for at least partially guiding said vial into said access port.

7. The combination according to claim 6 further including a removable unitary sleeve lining said access port and said sample chamber.

8. The combination according to claim 7 wherein said sleeve has a funnel-shaped entrance end for mating with said access port.

9. The combination according to claim 5 wherein said rod is formed of shielding material for shielding the crystal from radiation emanating from samples within said sample holder during measurement of the sample within said sample chamber.

10. The combination according to claim 5 further including a second access port communicating with and extending upwardly from said sample chamber and a removable plug of shielding material insertable within said second access port.

11. The combination according to claim 10 further including single vial holding means insertable within said second access port for positioning a vial within said sample chamber.

* * * * *